United States Patent
Palm

(10) Patent No.: US 9,010,112 B2
(45) Date of Patent: Apr. 21, 2015

(54) CONDENSATION TRAP FOR CHARGE AIR COOLER

(75) Inventor: James Raymond Palm, Ypsilanti Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1025 days.

(21) Appl. No.: 12/606,731

(22) Filed: Oct. 27, 2009

(65) Prior Publication Data

US 2011/0094219 A1    Apr. 28, 2011

(51) Int. Cl.
   F02B 33/44   (2006.01)
   F02B 37/18   (2006.01)
   F02B 29/04   (2006.01)
   F28F 17/00   (2006.01)

(52) U.S. Cl.
   CPC ............. *F02B 37/18* (2013.01); *F02B 29/0468* (2013.01); *F28F 17/005* (2013.01); *Y02T 10/146* (2013.01); *Y02T 10/144* (2013.01)

(58) Field of Classification Search
   CPC .... F02B 29/0468; F02B 37/18; F28F 17/005; Y02T 10/144; Y02T 10/146
   USPC .............................. 60/278, 599, 605.3, 605.2
   See application file for complete search history.

(56) References Cited

U.S. PATENT DOCUMENTS

| | | |
|---|---|---|
| 1,803,097 A | 4/1931 | Critchlow |
| 4,235,298 A | 11/1980 | Sackett et al. |
| 4,852,526 A | 8/1989 | Brown |
| 5,758,606 A | 6/1998 | Rosen et al. |
| 6,367,256 B1 * | 4/2002 | McKee ....................... 60/605.2 |
| 6,527,821 B2 * | 3/2003 | Liu et al. ...................... 55/385.3 |
| 6,598,388 B2 * | 7/2003 | Lucas et al. ..................... 60/311 |
| 6,681,171 B2 | 1/2004 | Rimnac et al. |
| 6,786,210 B2 | 9/2004 | Kennedy et al. |
| 7,131,263 B1 * | 11/2006 | Styles ............................. 60/278 |
| 7,451,750 B1 * | 11/2008 | Fox et al. ................ 123/568.12 |
| 7,530,336 B2 * | 5/2009 | Brecheisen, II ............. 123/25 A |
| 7,654,078 B2 * | 2/2010 | Marsal et al. .................... 60/278 |
| 7,797,937 B2 * | 9/2010 | Endicott et al. ............. 60/605.1 |
| 7,854,238 B2 * | 12/2010 | Zatarain .................. 137/247.21 |
| 7,926,272 B2 * | 4/2011 | Takemoto .................... 60/605.2 |
| 7,980,076 B2 * | 7/2011 | Buia et al. ........................ 60/599 |
| 8,061,135 B2 * | 11/2011 | Rutherford .................... 60/599 |
| 8,191,365 B2 * | 6/2012 | Quinn et al. .................... 60/599 |

(Continued)

FOREIGN PATENT DOCUMENTS

WO    2009/002233 A1    12/2008

OTHER PUBLICATIONS

Meyer, Robert Hornblower, "System for a Charge-Air Cooler," U.S. Appl. No. 13/185,118, filed Jul. 18, 2011, 31 pages.

*Primary Examiner* — Kenneth Bomberg
*Assistant Examiner* — Paolo Isada
(74) *Attorney, Agent, or Firm* — Julia Voutyras; Alleman Hall McCoy Russell & Tuttle LLP

(57) ABSTRACT

Various systems and methods are described for a charge air cooler coupled to an engine. One example method comprises collecting condensate discharged from the cooler in a condensation trap coupled to an outside surface of a bend in an outlet duct of the cooler; during a first condition, temporarily storing the condensate in a reservoir of the condensation trap; and, during first and second conditions, releasing the condensate to the outlet duct in a direction of airflow via a tube.

19 Claims, 3 Drawing Sheets

(56) References Cited

U.S. PATENT DOCUMENTS

| | | | |
|---|---|---|---|
| 8,191,366 B2* | 6/2012 | Taylor | 60/599 |
| 8,333,065 B2* | 12/2012 | Weber et al. | 60/297 |
| 2004/0079079 A1 | 4/2004 | Martin et al. | |
| 2007/0028640 A1* | 2/2007 | Hampton | 62/280 |
| 2007/0107425 A1* | 5/2007 | Appleton | 60/599 |
| 2008/0190079 A1* | 8/2008 | Cerdes | 55/319 |
| 2009/0013977 A1 | 1/2009 | Brecheisen, II | |
| 2009/0050117 A1 | 2/2009 | Tai et al. | |
| 2010/0205949 A1* | 8/2010 | Bolda et al. | 60/309 |
| 2010/0212346 A1* | 8/2010 | Bourne et al. | 62/281 |
| 2010/0229549 A1* | 9/2010 | Taylor | 60/599 |
| 2011/0127015 A1* | 6/2011 | Taras et al. | 165/104.34 |

\* cited by examiner

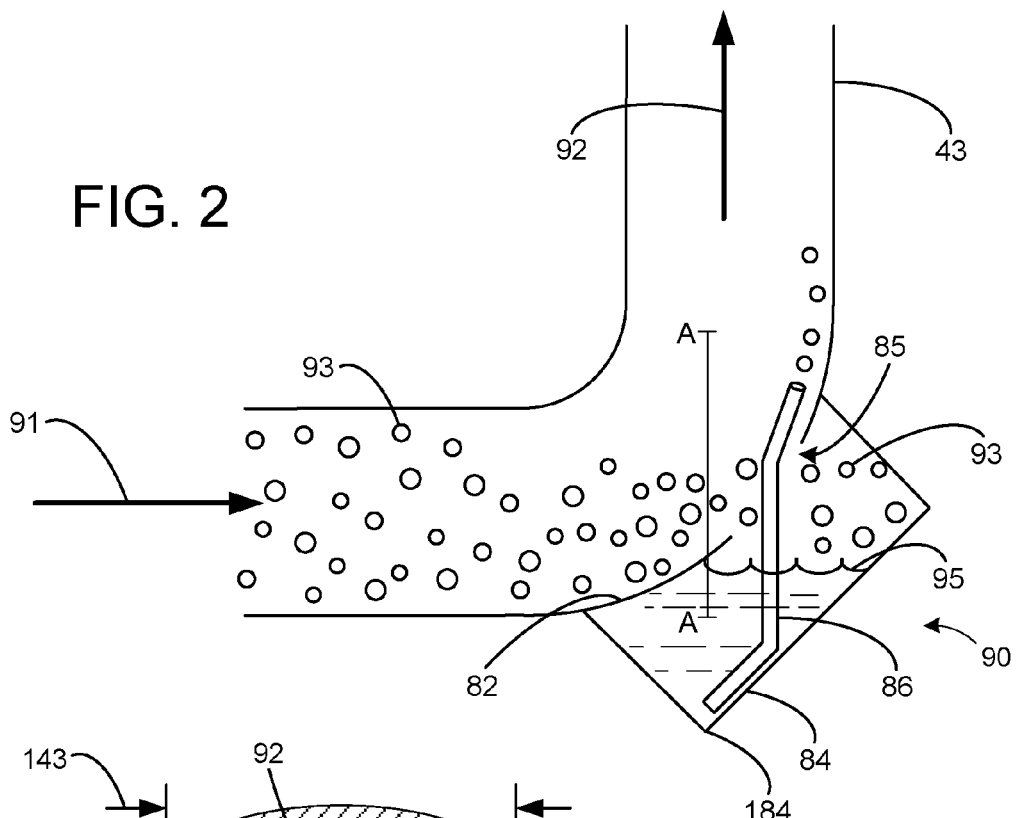

CONDENSATION TRAP FOR CHARGE AIR COOLER

TECHNICAL FIELD

The present application relates generally to a charge air cooler coupled to an intake manifold of a turbocharged engine in a motor vehicle.

BACKGROUND AND SUMMARY

Turbocharged and supercharged engines may be configured to compress ambient air entering the engine in order to increase power. Because compression of the air may cause an increase in temperature of the air, a charge air cooler may be utilized to cool the heated air thereby increasing its density and further increasing the potential power of the engine. If the humidity of the ambient air is high, however, condensation (e.g., water droplets) may form on any internal surface of the charge air cooler that is cooler than the dew point of the compressed air. During conditions such as a hard vehicle acceleration, these water droplets may be blown out of the charge air cooler and into the combustion chambers of the engine resulting in engine misfire, loss of torque and engine speed, and incompletely burned fuel, for example.

One approach for reducing the amount of condensation entering the combustion chambers is disclosed in US Patent Application Publication 2008/0190079. In the cited reference, a liquid trap for collecting condensation is placed in fluid communication with an air intake conduit downstream of the air cooler. The liquid trap may be coupled to a collection tank having a liquid level sensor which stores the collected condensation. The sensor may indicate when the water level becomes high and the collection tank needs to be emptied. Such a system may require a drain valve which may eventually stick closed or stick open causing a loss of boost pressure and subsequent loss of power to the engine. Such a system may also require the collection tank to be drained to the surroundings exterior to the vehicle. The condensation may contain regulated emissions, however, and draining the tank to the vehicle surroundings may not be an available option.

The inventor herein has recognized the above problems and has devised an approach to address them. Thus, a method for a charge air cooler coupled to an engine is disclosed. The method comprises collecting condensate discharged from the cooler in a condensation trap coupled to an outside surface of a bend in an outlet duct of the cooler; during a first condition, temporarily storing the condensate in a reservoir of the condensation trap; and, during first and second conditions, releasing the condensate to the outlet duct in a direction of airflow via a tube.

In one example, the condensate may be released slowly at a rate which is not detrimental to engine operation. For example, during a transient high load engine condition such as a hard acceleration, the condensate may be temporarily stored and released in the direction of airflow to the outlet duct at a rate that is less than a threshold rate of release. In this way, the amount of condensate reaching the combustion chambers may be reduced. Further, since the condensate is released back slowly to the outlet duct, and then delivered to the engine, issues with draining the reservoir are resolved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 shows a schematic diagram illustrating the condensation trap depicted in FIG. 1.

FIG. 3 shows a schematic diagram of a cross sectional view of the condensation trap taken along line A-A of FIG. 2.

DETAILED DESCRIPTION

The following description relates to embodiments of a condensation trap with a charge air cooler in a turbocharged engine for reducing the rate at which condensation enters the combustion chambers of the engine. The condensation trap may be coupled to a bend in an outlet duct, and airflow in the outlet duct may be in communication with the condensation trap via an opening in an outside surface of the bend of the outlet duct. The bend in the outlet duct may encourage water droplets (e.g., condensate) in the airflow to enter the condensation trap. Furthermore, the condensation trap may comprise a reservoir for collecting the condensate and a tube for releasing the condensate back to the outlet duct. Based on engine operating conditions, the collected condensate may be temporarily stored in the reservoir to a greater extent under some operating conditions as compared to others. For example, during transient high load engine conditions when a greater amount of condensate is discharged from the charge air cooler, the collected condensate may be temporarily stored and then released at a later time which is not detrimental to engine operation. In this way, a more steady flow of condensate to the engine is provided, thus reducing potential for degradation of engine combustion. In other words, when a greater amount of condensate is generated, the amount of stored condensate can be temporarily increased. During other conditions when less condensate is generated, the storage amount may be gradually reduced via the tube.

Figure 1:
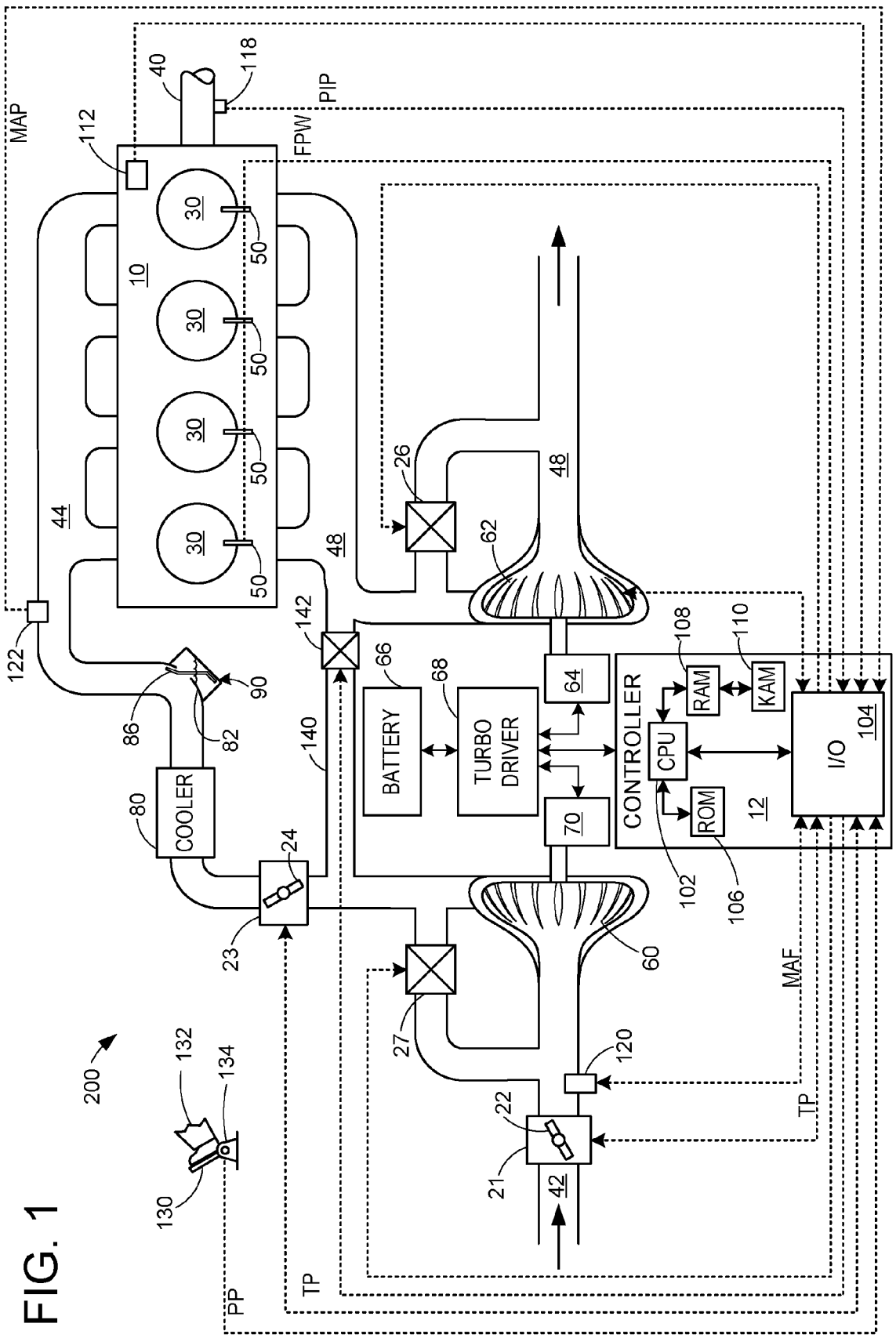
FIG. 1 shows a schematic diagram of an engine including a charge air cooler and a condensation trap.
Figure 4:
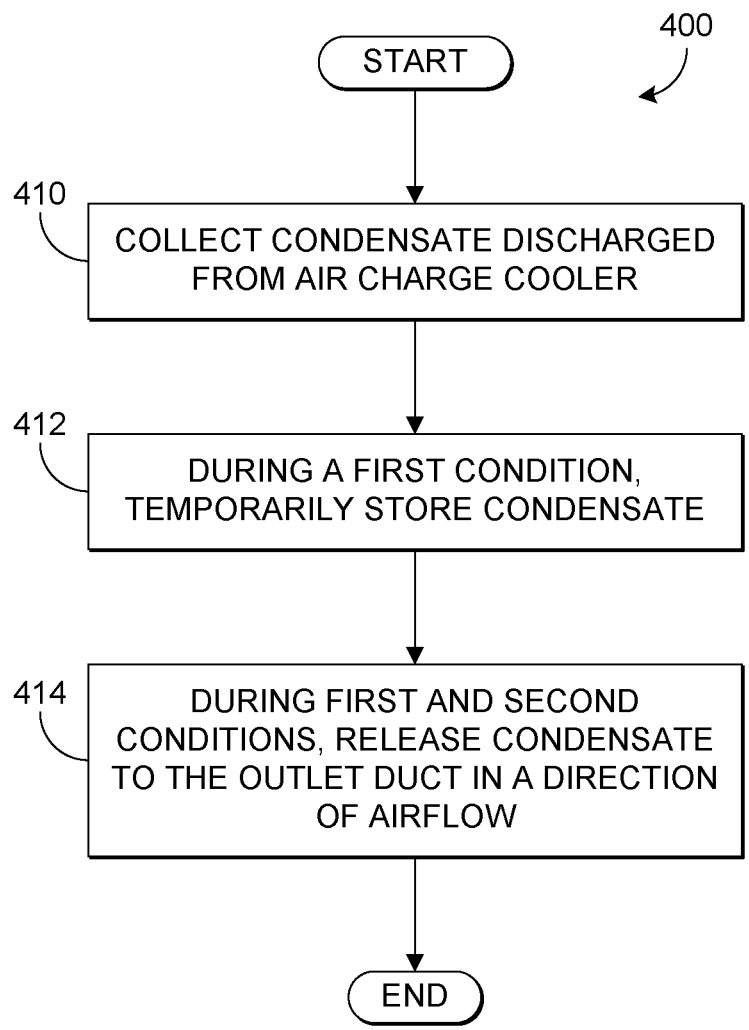
FIG. 4 shows a flow chart illustrating a method for a condensation trap.

FIGS. 1-3 show example embodiments of a condensation trap. The schematic diagram in FIG. 1 shows a turbocharged internal combustion engine with a condensation trap coupled to an outlet duct of a charge air cooler. FIG. 2 shows a schematic diagram illustrating an example condensation coupled to a bend in an outlet duct of a charge air cooler. The schematic diagram in FIG. 3 shows a view of the condensation trap of FIG. 2 taken along a cross section. Finally, a method of operation of the condensation trap is illustrated in FIG. 4.

First, FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 48 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake passage 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an electric motor or actuator included with throttles 21 and 23, a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120 and a manifold air pressure sensor 122 for providing respective signals MAF and MAP to controller 12.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70.

Further, exhaust passage 48 may include wastegate 26 for diverting exhaust gas away from turbine 62. Additionally, intake passage 42 may include a wastegate 27 configured to divert intake air around compressor 60. Wastegate 26 and/or 27 may be controlled by controller 12 to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

In the example of FIG. 1, a condensation trap 90 is shown coupled to intake passage 42 (e.g., outlet duct of charge air cooler 80) downstream of charge air cooler 80. In some embodiments, such as the depicted embodiment, intake passage 42 may include a bend 82 to which condensation trap 90 is coupled. Condensation trap 90 will be described in greater detail below.

Moving on to FIG. 2, an embodiment of a condensation trap is illustrated schematically. In particular, condensation trap 90 of FIG. 1 is shown. The condensation trap may be utilized to collect water droplets discharged from the charge air cooler under conditions in which the ambient humidity is high and condensation is formed. This may occur, for example, in cooling tubes of the charge air cooler when they are at a temperature less than the dew point of the ambient air entering the cooler.

The direction of airflow exiting charge air cooler 80 is indicated by the arrow at 91 in FIG. 2. As depicted in FIG. 2, the airflow from cooler 80 may contain water droplets 93. The number and size of water droplets (e.g., amount of condensation) may depend on various engine operating conditions such as engine load. For example, during low load steady state engine conditions, condensation that is formed in cooling tubes of the charge air cooler may collect on the walls and/or internal fins of the cooling tubes. Once the walls and/or internal fins are saturated, additional condensation may be discharged from the cooler. This condensation (e.g., a relatively small amount of condensation) may be vaporized by the engine without causing a drop in stability of the engine.

In another example, during transient high load conditions in which the airflow rate of the engine may suddenly increase, condensation formed on the wall and/or internal fins of the cooling tubes of the charge air cooler may be blown off. In this manner, the water droplets (e.g., a relatively high amount of condensation) may enter the combustion chambers resulting in engine misfire, engine stumble, loss of torque, etc.

Continuing with FIG. 2, as shown, air and water droplets from charge air cooler 80 flow toward bend 82 in outlet duct 43. Air may turn the corner at the bend 82 and continue to flow toward the combustion chambers of the engine. Because of their greater mass, however, water droplets may be forced against the outside radius of the inner wall of outlet duct 43 due to centrifugal force generated while turning the corner at the bend 82. As such, outlet duct 43 may be configured to have an opening 85 through which the water droplets may pass.

FIG. 3 shows a cross sectional view of bend 82, including opening 85, taken along line A-A of FIG. 2. As depicted in the example of FIG. 3, opening 85 may have a rectangular shape with a length indicated at 96 and a width indicated at 97. The length and width of the opening may be set based on factors such as radius of the bend, angle of the turn (e.g., 90 degrees in FIG. 2), maximum and/or minimum speed of air exiting the charge air cooler, diameter of the outlet duct (indicated at 143 in FIG. 3), etc. Further, in other embodiments, the opening may have a shape other than rectangular. For example, the opening may have an elliptical shape or another suitable shape which has an area large enough to allow water droplets to pass through.

Turning back to FIG. 2, condensation trap 90 comprises a reservoir 84 which is coupled to bend 82. Reservoir 84 may be comprised of a cylindrical shape attached to the outer surface of outlet duct 43 at bend 82. Furthermore, reservoir 84 is positioned such that water droplets 93 that pass though opening 85 may be collected and, under some conditions, temporarily stored. For example, reservoir 84 is shown with a level of collected condensate 95. The bottom of reservoir 84 is indicated at 184 in FIG. 2. Herein, it will be understood that the bottom of the reservoir includes the lowest point in the reservoir with respect to gravity. Furthermore, as airflow passes through outlet duct 43 and past opening 85, high pressure may be created in reservoir 84.

Condensation trap 90 further comprises a tube 86 which passes through opening 85. As shown in FIG. 2, tube 86 is disposed to have a first end in reservoir 84 and a second end in the airflow of outlet duct 43. The first end may extend nearly to the bottom of the reservoir. As such, low levels (e.g., small amounts) of condensate may be removed from the reservoir. The second end may extend a distance in outlet duct 43 in a direction of the airflow 92. In this manner, a low pressure may be generated at the second end of tube 86 by high velocity airflow passing the second end of tube 86.

As shown in FIG. 2, tube 86 may be comprised of three sections. As such, the first end of tube 86 may be positioned near the bottom of reservoir 84 and the second end of tube 86 may extend through opening 85 and into outlet duct 43. Moreover, in such a configuration, the portion of tube 86 in outlet duct 43 may be close to the inner surface of outlet duct 43, thus reducing potential blockage of the outlet duct and allowing condensate to be released from reservoir 84 in the direction of airflow in outlet duct 43.

The high pressure inside of reservoir 84 and at the first end of tube 86 (e.g., inside the reservoir) and the low pressure at the second end of tube 86 (e.g., inside the duct) create a differential in pressure in tube 86, and condensate in the reservoir is caused to flow towards the second end of tube 86 and into outlet duct 43. Condensate released from tube 86 flows in the direction of the airflow in the outlet duct and into combustion chambers of the engine. When the release rate of the condensate is controlled to be below a threshold release rate, water droplets may be vaporized by the engine without affecting engine operation.

Release rate of the condensate may be at least partially controlled by the inner diameter of tube 86. For example, the greater the inner diameter of the tube, the greater the release rate of condensate may be for a given volume of condensate in the reservoir. The cross sectional view shown in FIG. 3 illustrates the inner diameter of tube 86 at 186, and the outer diameter of tube 86 is indicated at 286. In order to allow water droplets to pass into reservoir 84, the outer diameter 286 may be less than the width 97 of opening 85.

Furthermore, turning back to FIG. 2, the cross-sectional area at relatively lower levels of reservoir 84, with respect to a level of the condensate, may be smaller at relatively lower levels of reservoir 84 than a cross-sectional area at relatively higher levels of the reservoir. In this way, at smaller volumes of condensation the height of the liquid may rise relatively quickly, and at larger volumes the height of the liquid may rise relatively slowly for a given rate of flow of water droplets introduced into reservoir 84. The relatively quick rise in liquid level may, provide an earlier start for the reintroduction of the flow of condensate into the outlet duct, and may reduce the pressure required to draw the liquid from the first end of tube 86 to the second end of tube 86 and into the airflow. Also in this way the capacity of reservoir 84 may be high without reducing starting flow performance.

As described above, a condensation trap coupled to an outlet duct (e.g., intake manifold) of a charge air cooler may be configured to release collected condensate to the outlet duct below a threshold rate of release. In this manner, a flow rate of condensate may be controlled, thus reducing engine stability issues resulting from a high number of water droplets entering the engine. Further, a method for operation of the condensation trap is described below.

Finally, a method 400 for a condensation trap, such as condensation trap 90 described above, is shown in FIG. 4. Specifically, method 400 illustrates the operation of the condensation trap based on engine operating conditions such as vehicle speed, engine speed, and airflow to the engine.

At 410 of method 400, condensate discharged from the charge air cooler is collected. As described above, water droplets forced against the outside radius of the inner wall of the outlet duct may pass through the opening located in the bend and collect in the reservoir.

At 412 of method 400 in FIG. 4, condensate collected in the reservoir is temporarily stored during a first condition. The first condition may include, for example, transient high load engine operation. For example, as described above, during transient high load engine operation, a greater amount of condensate may be discharged into the outlet duct. As such, the condensate may be temporarily stored in order to reduce the rate at which water reaches the combustion chambers.

At 414 of method 400, condensate is released to the outlet duct in a direction of airflow during first and second conditions. During the high load engine operation of the first condition, the condensate may be temporarily stored and released at a rate such that the amount of water leaving the condensation trap does not interfere with engine operation (e.g., does not cause engine misfire, engine, stumble, etc.). For example, the rate of release of the water may be below a predetermined threshold rate of release.

The second condition may include, for example, low load steady state engine operation. During low load engine operation, a smaller volume of water may enter the condensation trap, and as such, water that enters the reservoir may be continually released to the outlet duct while remaining below the threshold rate of release.

Thus, condensate from a charge air cooler may be collected in a condensation trap coupled to an outlet duct of the cooler, and based on engine operating conditions, the introduction of collected condensate from the reservoir to the outlet duct may be controlled. In this way, engine stability may be maintained and the condensate may be drained from the reservoir in such a manner that the environment surrounding the vehicle is not harmed. In addition there is no possibility of boost pressure leakage from a drain valve which may eventually stick partly open.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A system comprising:
an outlet duct having a bend with an opening in the bend; and
a condensation trap comprising:
a reservoir coupled to an outside surface of the bend via the opening, the opening disposed to allow condensate from an airflow in the bend to pass through the opening and into the reservoir; and
a tube passing through and extending past the opening and disposed to have a first end in the reservoir and a second end extending into the airflow in an airflow direction.

2. The system of claim 1, wherein a first cross-sectional area of the reservoir is relatively smaller at relatively lower levels of the reservoir, with respect to a level of condensate, than a second cross-sectional area of the reservoir at relatively higher levels of the reservoir.

3. The system of claim 1, wherein the opening is rectangular and a width of the opening is larger than an outer diameter of the tube to allow passage of condensate through the opening and into the reservoir.

4. The system of claim 1, wherein the system is configured such that during a first condition, the reservoir temporarily stores condensate and the tube releases the condensate at a rate below a threshold rate of release.

5. The system of claim 4, wherein the system is configured such that the first condition includes transient high load engine operation.

6. The system of claim 1, wherein the system is configured such that during a second condition the tube continually releases condensate.

7. The system of claim 6, wherein the system is configured such that the second condition includes low load steady state engine operation.

8. A system for an engine in a vehicle, the system comprising:
a turbocharger;
an exhaust gas recirculation system;
a charge air cooler positioned before an intake manifold of the engine and downstream of the turbocharger;
an outlet duct of the charge air cooler, the outlet duct including a bend; and
a condensation trap coupled to an outside surface of the bend in the outlet duct of the charge air cooler, the condensation trap comprising:
a reservoir having an opening, the reservoir in communication with an airflow from the charge air cooler via the opening to the outside surface of the bend, the opening disposed to allow condensate from the airflow to pass through the opening and into the reservoir; and
a tube passing through and extending past the opening with a first end in the reservoir and a second end extending into the airflow of the outlet duct in a direction of the airflow.

9. The system of claim 8, wherein the system is configured such that it passes condensate from the airflow in the outlet duct through the opening, collects the condensate in the reservoir, and releases the condensate based on an engine operation condition.

10. The system of claim 9, wherein, the system is configured such that during a first condition including transient high load engine operation, condensate is temporarily stored in the reservoir.

11. The system of claim 9, wherein, the system is configured such that during a second condition including steady state low load engine operation, condensate is continually released to the outlet duct in the direction of the airflow via the tube.

12. The system of claim 10, wherein the system is configured such that a rate of release of the stored condensate is below a threshold rate of release.

13. The system of claim 1, the system further including a charge air cooler, wherein an exhaust gas recirculation passage delivers exhaust gas to an intake passage upstream of the charge air cooler.

14. The system of claim 1, the system further including a charge air cooler, wherein the charge air cooler is positioned in an intake passage, with the bend in the outlet duct being a bend in the intake passage between the charge air cooler and an intake manifold, and wherein the charge air cooler is positioned downstream of a compressor of a turbocharger in an engine intake system.

15. The system of claim 3, wherein the first end of the tube extends not all the way to a bottom of the reservoir.

16. The system of claim 3, wherein the tube is spaced away from the outlet duct to form the opening of the reservoir to the airflow in the outlet duct.

17. The system of claim 8, wherein the opening bypasses the tube to allow passage of condensate in the airflow through the opening and into the reservoir.

18. The system of claim 8, wherein the opening is an opening between an inner wall of the outlet duct and the reservoir, the opening in fluid communication between the reservoir and the outlet duct, outside of the tube.

19. The system of claim 8, wherein the opening is formed between an inner wall of the outlet duct and the tube.

\* \* \* \* \*